Patented Apr. 17, 1934

1,955,114

UNITED STATES PATENT OFFICE 1,955,114

INSECTICIDE

William McIlvaine Dickson, Woodside, Del., assignor to General Chemical Company, New York, N. Y., a corporation of New York No Drawing. Application May 11, 1931, Serial No. 536,678

17 Claims. (Cl. 167—15)

The present invention relates to insecticides, and in its more specific aspects is directed to improvements in insecticides adaptable for use as insecticidal sprays or ducts for the treatment of plants generally, fruits in particular, and soils.

Various arsenicals such as Paris green, calcium arsenate, lead arsenate, zinc arsenate and ferric arsenate have been employed or their use suggested for controlling insect pests, either in powder form or in water suspension.

The present invention is directed to the provision of an insecticide composition comprising primarily lead arsenate and ferric arsenate. As mentioned, the toxic properties of both these compounds have long been known, and such substances, and lead arsenate in particular, have been employed in the capacity of insecticides separately. Although the separate use of lead arsenate and ferric arsenate as insecticides has been familiar practice, to my knowledge it has never been known that a composition of matter the major portion of which consists of lead arsenate and ferric arsenate in certain proportions possessed effective insecticidal properties far beyond those of the compounds separately or when used in admixture with other substances. It was not to be expected that the combination of two compounds well known in the art would produce an insecticide much more efficient than equal or greater amounts of the separate compounds. Accordingly, the invention is directed to the provision of an insecticidal composition comprising lead arsenate and ferric arsenate as the principal toxic agents employed either as an insecticide consisting of these compounds, or having incorporated therewith other suitable substances to adapt the insecticide of the invention to the treatment of some particular fruit, or, for example, to include therein a substance having fungicidal properties.

The proportions of lead arsenate and ferric arsenate in the improved insecticide may be varied over a considerable range, although particularly good results have been obtained by the use of certain hereinafter specified quantities. Generally speaking, the insecticide contains a predominating quantity of lead arsenate, in most instances not less than about 60%, an amount in the neighborhood of around 80% lead arsenate being preferred, whatever the balance of the composition may be.

One preferred insecticidal composition which has proved remarkably efficient in practice, and containing lead arsenate and ferric arsenate, consists of these substances in the proportion of about 80% lead arsenate and 20% ferric arsenate. In tests carried out in the field for the purpose of comparing the efficiency of this particular composition with other well known insecticides procurable in the market containing lead arsenate as a major constituent, it was found that in the case of apples treated with present known and commercially common insecticides, the percentage of codling moth sting was considerably in excess of 50%, whereas in the case of the above described composition employed under identical conditions, the percentage of sting was reduced to less than 25%.

There are situations encountered in practice where it is desirable to incorporate into the composition of the present invention other substances to meet some prevailing local condition, or to provide for more successful treatment of certain fruits. For example, for the treatment of apples and peaches, it is often desirable and advantageous to introduce into the present insecticide some such substance as hydrated lime to prevent burning and consequent damage to the foliage. Where hydrated lime was utilized for the purpose, good results were obtained where the insecticide contained about 80% lead arsenate, about 10% ferric arsenate, and about 10% of hydrated lime.

In other instances, because of some particular prevailing local condition, it may be desired to include in the insecticide some substance having fungicidal properties, and to this end, a small proportion of Bordeaux mixture has been employed with marked success. One satisfactory composition including this mixture is composed of about 80% lead arsenate, about 10% ferric arsenate and about 10% Bordeaux mixture containing about 25% copper. In comparative field tests employing the above compositions having therein hydrated lime and the Bordeaux mixture, the codling moth sting on a number of varieties of apples was reduced in all cases to 30% and under as compared with something in excess of 50% in cases where commonly known insecticides were used under the same conditions.

In all of the above compositions, the lead arsenate content should not be less than about 60% and preferably close to 80%. The ferric arsenate, and the hydrated lime and Bordeaux mixture contents of course vary in accordance with the quantity of lead arsenate employed. In most instances, the proportion of ferric arsenate utilized should not preferably fall below 5% of the total mixture, although, as mentioned above, the preferred quantity is around 10%. Likewise, in situations where hydrated lime or Bordeaux mixture is used in conjunction with the lead arsenate and ferric arsenate, the amounts of such former substances vary in accordance with the quantities of lead arsenate and ferric arsenate. Usually, however, where hydrated lime or Bordeaux mixture is used, the quantity of these substances should preferably be not in excess of about 12–15% of the entire composition.

When the above compositions are to be employed as a spray, satisfactory suspensions may be made up by mixing about one to one and one-half pounds of the insecticide with about 50 gallons of water. Application to the fruit under treatment is effected in the usual manner.

I claim:

1. An insecticide comprising lead arsenate and ferric arsenate.

2. An insecticide comprising not less than about 60% lead arsenate, and not less than about 5% ferric arsenate.

3. An insecticide comprising about 80% lead arsenate, and not less than about 10% ferric arsenate.

4. An insecticide consisting of lead arsenate and ferric arsenate.

5. An insecticide consisting of about 80% lead arsenate, and about 20% ferric arsenate.

6. An insecticide comprising lead arsenate, ferric arsenate, and hydrated lime.

7. An insecticide comprising not less than about 60% lead arsenate, not less than about 5% ferric arsenate, and hydrated lime.

8. An insecticide comprising about 80% lead arsenate, not less than about 10% ferric arsenate, and hydrated lime.

9. An insecticide consisting of lead arsenate, ferric arsenate, and hydrated lime.

10. An insecticide consisting of about 80% lead arsenate, about 10% ferric arsenate, and about 10% hydrated lime.

11. An insecticide comprising lead arsenate, ferric arsenate, and Bordeaux mixture.

12. An insecticide comprising not less than about 60% lead arsenate, not less than about 5% ferric arsenate, and Bordeaux mixture.

13. An insecticide consisting of lead arsenate, ferric arsenate, and Bordeaux mixture.

14. An insecticide consisting of about 80% lead arsenate, about 10% ferric arsenate, and about 10% Bordeaux mixture containing about 25% copper.

15. The process which comprises treating plants and soils with an insecticide comprising lead arsenate and ferric arsenate.

16. The process which comprises treating plants and soils with an insecticide comprising lead arsenate, ferric arsenate, and hydrated lime.

17. The process which comprises treating plants and soils with an insecticide comprising lead arsenate, ferric arsenate, and Bordeaux mixture.

WILLIAM McILVAINE DICKSON.